United States Patent [19]

Plummer

[11] 4,105,300
[45] Aug. 8, 1978

[54] DEFOCUSED UNICELL PHOTOMETER WITH ASPHERIC ZONE

[75] Inventor: William T. Plummer, Concord, Mass.

[73] Assignee: Polaroid Corporation, Cambridge, Mass.

[21] Appl. No.: 763,930

[22] Filed: Jan. 31, 1977

[51] Int. Cl.² ............................. G01J 1/42; H01J 3/14
[52] U.S. Cl. ................................. 356/225; 250/237 R
[58] Field of Search ....................... 356/225, 221, 224; 250/237 R, 239

[56] References Cited
U.S. PATENT DOCUMENTS

| 3,880,528 | 4/1975 | Petersen | 356/225 |
| 4,040,751 | 8/1977 | Baker et al. | 356/225 |
| 4,055,761 | 10/1977 | Shimonura | 350/67 |

Primary Examiner—John K. Corbin
Assistant Examiner—Rolf Hille
Attorney, Agent, or Firm—Edward S. Roman

[57] ABSTRACT

A defocused unicell photometer of the type having a positive lens element is provided with at least one aspheric zone on a portion of the lens element surface to change the directional response characteristic of the photometer in a select manner without increasing the extreme field of view of the photometer.

5 Claims, 8 Drawing Figures

DEFOCUSED UNICELL PHOTOMETER WITH ASPHERIC ZONE

BACKGROUND OF THE INVENTION

1. Field of the Invention

This invention relates generally to a defocused unicell photometer with aspheric surface and, more particularly to a defocused unicell photometer with aspheric surface for providing select directional response characteristics without increasing the extreme field of view.

2. Background of the Prior Art

Use of unicell photometers for evaluating scene light to predict and/or control photographic exposures is well known. Such photometers generally consist of a photoresponsive transducer and a lens element for receiving actinic radiation from a scene and directing it onto a photosensitive surface of the transducer. The transducer may be either of the photovoltaic or photoresistive type and provide an output signal indicative of the actinic radiation incident to its photosensitive surface. The output signal from the transducer may thereafter be utilized to predict a photographic exposure condition or to actually control the closing of an automatic shutter blade mechanism at the appropriate film exposure condition. The output signal from such photometers is directionally responsive to the influence of actinic radiation from various scene objects within its field of view as based on their angular field position. Thus, brightly reflective scene objects which are located substantially on-axis with respect to the optical axis of the photometer contribute to a significantly greater portion of the output signal from the photometer than identical objects substantially displaced off the optical axis of the photometer. Since the directional response characteristic of most photometers is inherently so heavily weighted in favor of brightly reflective scene objects located substantially on-axis with respect to the optical axis of the photometer, it becomes generally desirable to suppress the on-axis response of the photometer while simultaneously increasing its off-axis response to provide a directional response substantially less sensitive to the position of a brightly reflective photographic subject in the field of view of the photometer. However, there is no absolute best directional response curve that would have universal photographic application since light distribution patterns will vary greatly between various photographic scenes. Thus, it becomes desirable to provide a means by which select directional response patterns may be achieved in a simple and economical manner without increasing the number of components customarily utilized in a unicell photometer.

One photometer, described in U.S. Pat. No. 3,162,766 entitled "Photoelectric Receiver with Supplementary Iris Diaphragm" by Ploke et al., issued Dec. 22, 1964 discloses a photoelectric receiver having a light diffusion body arranged between a photoelectric receiver and iris diaphragm. The light diffusion body is in the form of a lens wherein in one of the two faces of the light diffusion body there is included an aspheric for the purpose of obtaining a stronger concentration of the incoming parallel beam of light. The photoelectric receiver of Ploke, however, falls within the category of photometers known as "focused" thereby limiting the change in the directional response that may be achieved through the use of an aspheric.

Therefore, it is a primary object of this invention to provide an improved defocused unicell photometer wherein the directional response of the photometer may be specifically tailored to suit almost any directional response requirement imposed thereon.

It is another object of this invention to provide an improved defocused unicell photometer wherein the directional response curve for the photometer is suppressed with respect to on-axis actinic radiation incident thereto while being simultaneously broadened with respect to incident off-axis actinic radiation incident thereto without any change in the extreme field of view of the photometer.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A defocused unicell photometer of the type suitable for use in photographic apparatus comprises a photosensitive transducer having a photosensitive surface thereon of predetermined dimension. The transducer operates to provide an output response which varies in correspondence with the intensity of actinic radiation incident to its photosensitive surface. A positive lens element of predetermined focal length is concentrically disposed about an optical axis which ultimately intersects the photosensitive surface. The lens element is also spaced apart from the photosensitive surface by a distance different from the lens focal length. The positive lens element in cooperation with a photosensitive surface of the transducer define a field of view for the photometer whereby the lens element operates to direct actinic radiation incident thereon from the field of view towards the photosensitive surface of the transducer. The lens element additionally has at least one aspheric zone disposed on a surface thereof for directing a select portion of actinic radiation from the field of view in a manner operating to change the intensity of the select portion of actinic radiation which ultimately impinges on the photosensitive surface from the zone. In this manner, there is effected a corresponding change in that portion of the output response from the transducer which is directly attributable to the select portion of actinic radiation. In addition, means are provided for stationing the transducer and lens element in substantially light-tight spaced apart relation with respect to each other.

In one preferred embodiment, the aspheric zone is concentrically and rotationally symmetric on a face of the lens element. The concentric aspheric zone is further characterized by a slope which increases and a radius of curvature which decreases in correspondence with increasing distance from the optical axis for directing that select portion of actinic radiation which directly impinges on the aspheric zone from the field of view in directions generally on the optical axis in a manner operating to reduce the intensity of the on-axis portion of actinic radiation which ultimately impinges on the photosensitive surface. There is thus effected a corresponding suppression in that portion of the output response from the transducer which is directly attributable to the on-axis portion of actinic radiation. The aspheric zone directs that other portion of actinic radiation which directly impinges on the lens element from the field of view in directions substantially off the optical axis in a manner operating to increase the intensity of that other off-axis portion of actinic radiation which ultimately impinges on the photosensitive surface from the lens element. In this manner, there is effected a corresponding increase in that portion of the output response from the transducer which is directly attributable to the other off-axis portion of actinic radiation.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts and wherein:

DESCRIPTION OF THE PREFERRED EMBODIMENT

Figure 1:
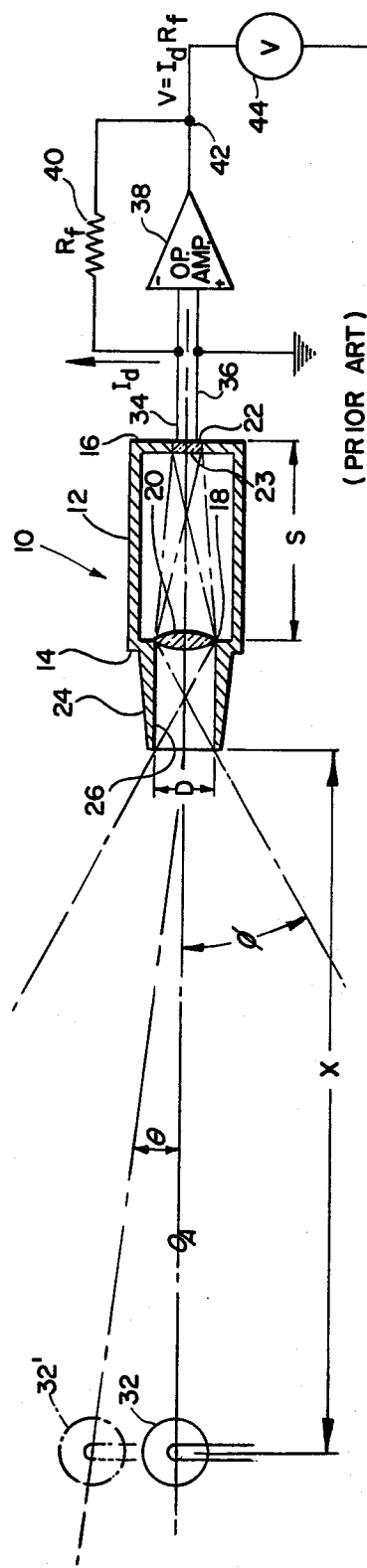
FIG. 1 is a cross-sectional view of a conventional photometer in combination with appropriate circuitry as schematically illustrated for measuring the output response of the photometer.

The directional response of a conventional photometer may be measured in the following manner. Referring now to FIG. 1, there is shown an arrangement through which the directional response for a simple unicell photometer 10 may be measured in a manner as is well known in the art. The photometer 10 is symmetrical about its optical axis so as to provide a rotationally symmetrical directional response. The photometer 10 includes a housing section 12 having forward and rear walls 14 and 16 respectively. The forward wall 14 has an aperture 18 in which is centered a positive, double convex lens 20 for receiving actinic radiation and directing it towards a photosensitive transducer 22 located along the optical axis $O_A$ and centered in the rear wall 16. The lens 20 is spaced apart from the photosensitive transducer 22 by a distance S which is greater than the focal length of the lens 20 thereby placing the photometer 10 in a class of unicell photometers which are generally referred to as "defocused".

The photosensitive transducer 22 may be either of the photovoltaic or photoresistive type although the following description will be hereinafter limited to a transducer of the photovoltaic type. The photovoltaic transducer 22 thus responds to the impingement of actinic radiation on its photosensitive surface 23 by providing a current $I_d$, which is proportional to the intensity of the actinic radiation incident to its photosensitive surface. In addition, the photovoltaic transducer 22 preferably provides a uniform response over its surface such that the electrical response per unit area of the photosensitive surface to a unit of incident flux remains constant regardless of position on the surface.

The lens 20 in combination with the photovoltaic transducer 22 cooperatively define a field of view for the photometer 20, which field of view may be diagrammatically illustrated by the semifield angle $\phi$. The size of the field of view depends upon the focal length of the lens 20, the separation distance S between the lens 20 and transducer 22, the focal length of the lens 20, and the size of the photosensitive surface 23 of the photodetector 22.

Concentric to the lens 20 and extending outwardly from the forward wall 14, there is provided a cylindrical flarehood as shown generally at 24. The flarehood 24 operates to preclude stray or indirect radiation emanating from outside the field of view from entering the interior of the housing 12. The interior of the flarehood 24 defines a cylindrical surface 26 of diameter D which extends longitudinally through the flarehood 24. The diameter D is a sufficient dimension so that the flarehood 24 does not interfere with the field of view. In addition, the interior of the housing 12 may be provided with any well known materials for absorbing any stray radiation not blocked by the flarehood 24.

The data required to calculate the directional response of the photometer 10 is obtained by first placing a constant intensity light source at some distance X forward of the photometer and on the optical axis $O_A$, and then measuring the variation in the electrical response of the transducer 22 as the light source 32 is moved within the field of view of the photometer 10 to different angular locations along a plane perpendicular to the optical axis $O_A$. The size of the light source 32 is chosen so that the angle subtended by the source is substantially small in comparison to the semifield angle $\phi$ of the photometer. The intensity of the light source 32 is selected so that the minimum intensity of actinic radiation incident to the transducer 22 always remains above its minimum level of detectivity. In addition, the remainder of the field of view is maintained dark in order to insure that the output of the transducer 22 is due solely to the actinic radiation received from the light source 32 and not from any other potential background illumination.

Figure 2:
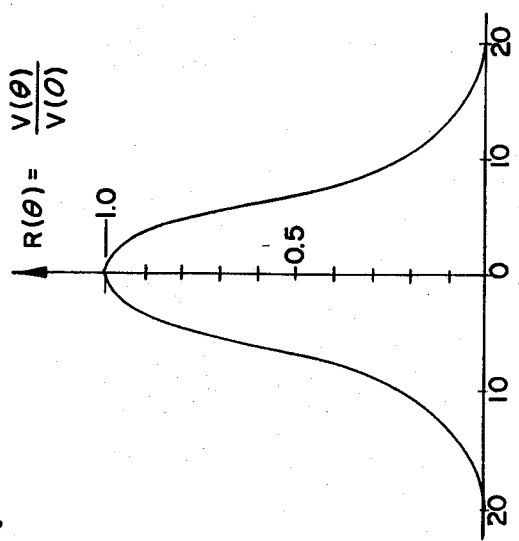
FIG. 2 is a graphical representation of the directional response curve of the photometer of FIG. 1.

The photovoltaic transducer 22 is provided with a pair of output leads 34 and 36 which respectively connect to an appropriate circuit for measuring the electrical response of the transducer 22. The measuring circuit includes a high gain operational amplifier 38 having a pair of input terminals which connect respectively to the output leads 34 and 36 from the transducer 22. The operational amplifier 38 includes an output lead 42 which connects by way of a feedback resistor 40 to the output lead 34 from the transducer 22. A volt meter 44 may be connected to the output lead 42 to provide a measure of the photovoltaic response from the transducer 22. Thus, as the light source 32 is moved along the plane perpendicular to the optical axis $O_A$ to different angular field locations such as designated at $\theta$, the output voltage from the transducer 22 will vary in accordance with the graph of FIG. 2 to provide the directional response of the photometer 10. Characteristically, the directional response will be in the form of a bell shaped curve having a peak on axis response, $V_o$, which decays to 0 when $\theta$ equals the semifield angle $\phi$. Although the output response from the photovoltaic transducer 22 will change as a function of the intensity of the light source 32, it is readily apparent that this will have no impact on the general shape of the directional response curve for the photometer 10 provided the magnitude of the incident actinic radiation is maintained within the linear response range for the transducer 22. Thus, the graph of FIG. 2 completely characterizes the directional response of the photometer 10 within its range of linear response. The directional response of the photometer 22 as graphically illustrated in FIG. 2 may be normalized as a nondimensional function for all intensities of illumination of the light source 32 by graphing the ratio of the off-axis voltage response $V(\theta)$ of the transducer 22, to the on-axis voltage response $V_o$ of the transducer 22 as shown in FIG. 2. Thus, the graph of FIG. 2 illustrates a directional response for the photodetector 10 as normalized with respect to the on-axis peak response $V_o$.

Figure 4:
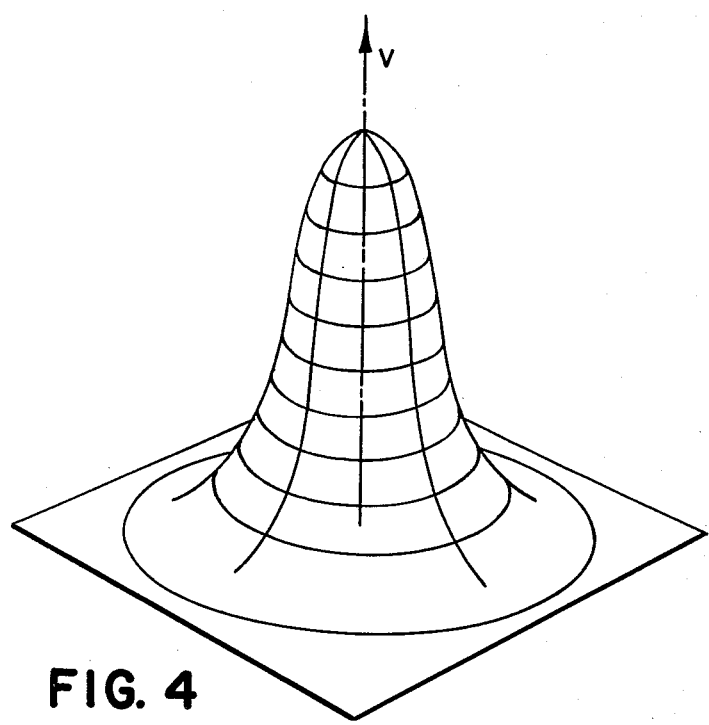
FIG. 4 is a three dimensional graph of the curve of FIG. 3.

Whereas the geometry of the photometer 10 is rotationally symmetric about its optical axis $O_A$, its directional response is also rotationally symmetric. Thus, a three-dimensional graph may be plotted for the directional response of the photometer 10 as shown in FIG. 4 whereby the volume enveloped by the three-dimensional graph corresponds to the output signal from the transducer for a uniformly backlit or bright scene. The directional response of a photometer may thus be defined as that mathematical function that describes the relationship between the on-axis and off-axis response of a photometer to a light source that occupies a small percentage of an otherwise totally darkened field as the source is positioned at different angular locations in the field. The directional response of a photometer will therefore provide an indication of what portion of the total output response from the photometer is directly attributable to various objects scattered throughout the field of view. The relative significance of any particular object within the field of view with respect to that portion of the photometer's output response directly attributable to that object is a direct function of that object's angular field position and its luminous intensity.

Figure 5:
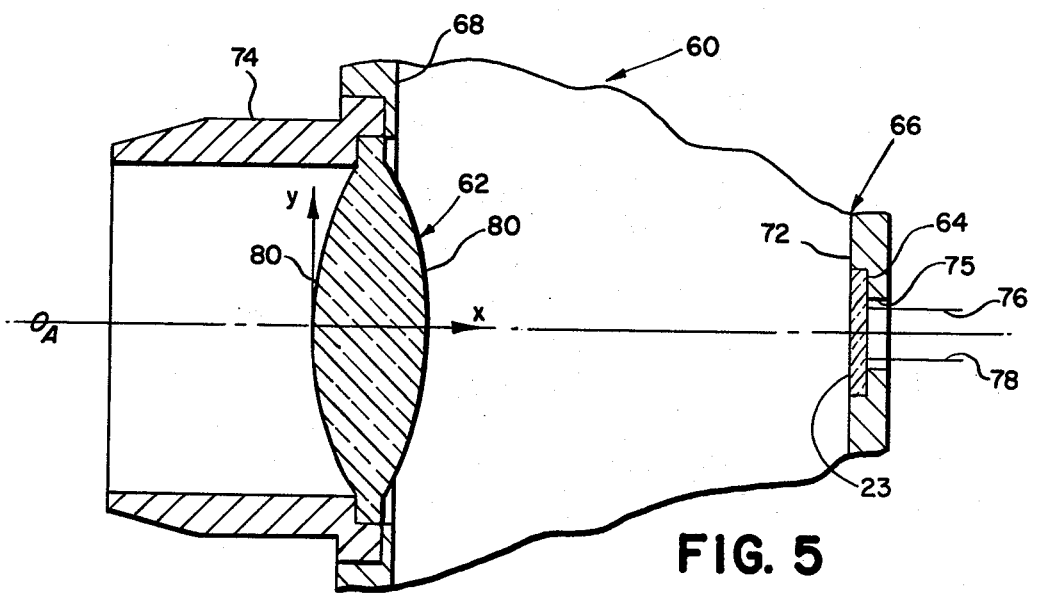
FIG. 5 is a cross-sectional view of the photometer of this invention.

Referring now to FIG. 5, there is shown generally at 60 the defocused unicell photometer of this invention comprising a positive lens element 62 spaced apart from a photoresponsive transducer 64 which is preferably of the photovoltaic type. The lens element 62 preferably has opposed convex aspheric surfaces configured in a manner to be subsequently described in greater detail herein. Means comprising a housing as shown generally at 66 are provided for stationing the transducer 64 and lens element 62 in substantially light-tight spaced apart relation with respect to each other. As previously discussed, the focal length of the lens element 62 is shorter than the distance separating the lens element 62 and transducer 64, thus categorizing the photometer as defocused.

It will be readily understood that the housing 66 may comprise any portion of a camera shutter housing having a front wall member 68 and a rear wall member 72 between which there may be disposed a shutter mechanism (not shown) in a well-known manner. The front wall member 68 may include a cylindrical flarehood 74 extending outwardly therefrom to exclude stray or indirect radiation from outside the field of view from entering the interior of the housing 66. Again, the field of view is defined by the combined arrangement of the lens element 62 and the photoresponsive transducer 64 and is preferably not limited by the flarehood 74. The rear wall member 72 may include an opening 75 therethrough to accommodate the outward extension of a pair of output leads 76 and 78 from the transducer 64. The output leads 76 and 78 may extend through the opening 74 to connect to any suitable circuit such as that illustrated in FIG. 1. Light deflecting baffles (not shown) may also be provided in a well-known manner between the front and rear wall members 68 and 72 to deflect stray and unwanted actinic radiation.

As previously discussed, the transducer 64 is preferably of the photovoltaic type and, more specifically, may comprise a silicon photodiode which has the advantage of a relatively fast response time, low memory, excellent linearity, together with ready adaptability to convenient shapes and sizes. In addition, although silicon tends to be red sensitive, this may be easily corrected with appropriate filters. It may be assumed that any red sensitivity associated with the transducer is corrected with aopprpriate filters (not shown).

The lens element 62 is preferably a double convex molded plastic, positive lens having concentric, rotationally symmetric opposed ashperic surfaces 80 with each aspheric surface 80 being characterized by a slope which increases and a radius of curvature which decreases in correspondence with increasing distance from the optical axis $O_A$. The aspheric surfaces 80 may be further characterized by the equation $X = 2Y^2 - 10Y^4$ wherein the X axis corresponds to the optical axis $O_A$ and the Y axis is perpendicular to the X axis as shown in FIG. 5. The point of intersection between the X and Y axis coincides to the point of intersection between the aspheric lens 80 and the optical axis $O_A$. The lens element may be molded of any suitable optical polymer such as acrylic, styrene, styrene-acrylonitrile, or the like.

Thus, as was previously described, the lens element 62 operates the direct actinic radiation incident thereon from the field of view towards the photosensitive surface of the transducer 64. The aspheric surfaces 80, in turn, direct or refract a select portion of the actinic radiation which directly impinges thereon from the field of view at on-axis angles, in a manner operating to reduce the intensity of that select portion of the on-axis actinic radiation which ultimately reaches the photosensitive surface of the transducer. There is thus affected a corresponding suppression in that portion of the output response from the transducer 64 which is directly attributable to that select portion of on-axis actinic radiation. In addition, the lens element 62 and aspheric surfaces 80 cooperate to direct or refract that other portion of actinic radiation which directly impinges thereon from the field of view in directions substantially off-axis with respect to the optical axis $O_A$ in a manner operating to increase the intensity of the select off-axis portion of actinic radiation which ultimately impinges on the photosensitive surface of the lens element. In this manner, there is effected a corresponding increase in that portion of the output response from the transducer 64 which is directly attributable to the other select off-axis portion of actinic radiation.

Figure 6:
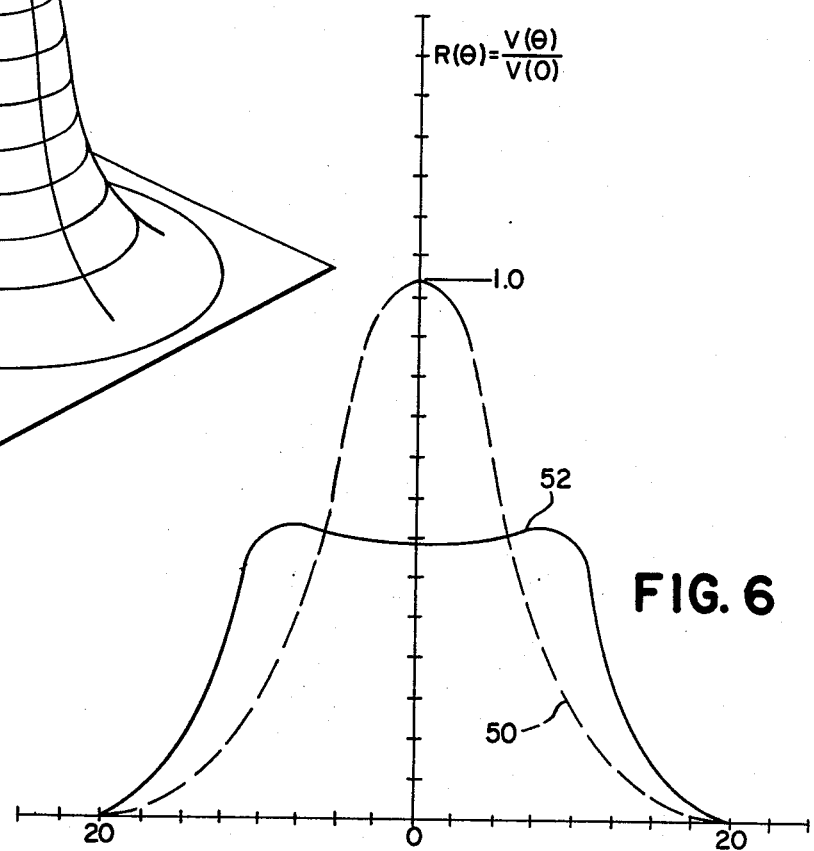
FIG. 6 is a graph of the directional response curve for the photometer of FIG. 5.

Referring now to FIG. 6, there is shown in phantom at 50 the graphical representation for the normalized directional response curve of the photometer 60 as would occur absent the ashperic surfaces 80. The solid line curve 52 shows a normalized directional response for the photometer 60 as now results when the above-described aspheric surfaces 80 are included in the lens element 62. Thus, a comparison of the two curves of FIG. 6 illustrate the impact of the aspheric surfaces 80 on the variable response curve of the photometer 60. The directional response curve 52 for the photometer 60 with the aspheric surfaces 80 is seen to provide an increase in that portion of the output response from the transducer which is directly attributable to actinic radiation incident from off-axis locations within the field of view while conversely suppressing that portion of the output response of the transducer which is directly attributable to actinic radiation incident from on-axis locations in the field of view. Thus, the directional response curve has been broadened and flattened in the above-described manner without increasing the extreme field angle of the photometer. As is now readily apparent, such a change in the directional response curve of the photometer 60 has been accomplished regardless of changes in other photometer design parameters such as cell size, focal length and lens-to-cell separation distance.

Figure 7:
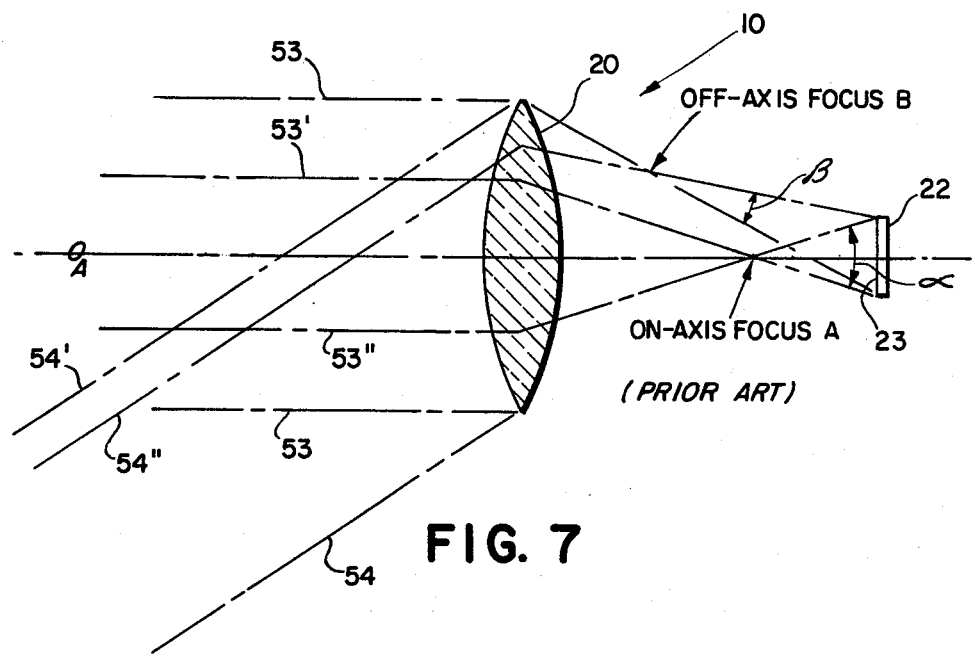
FIG. 7 is a cross-sectional view of a portion of the photometer of FIG. 1 illustrating actinic radiation incident at both on-axis and off-axis angles.
Figure 8:
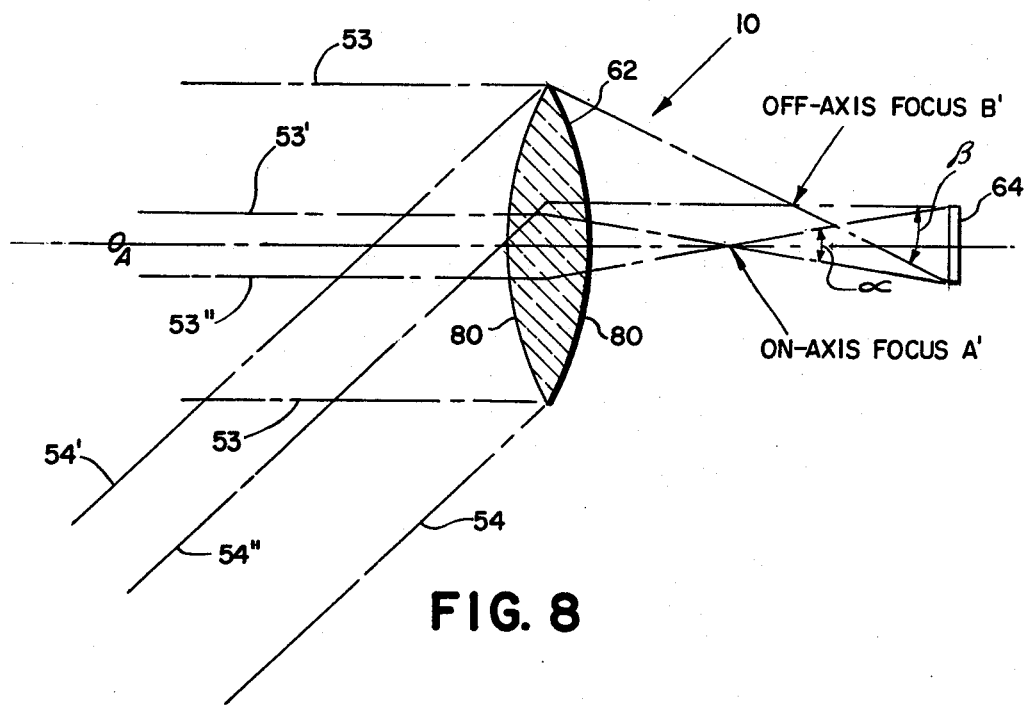
FIG. 8 is a cross-sectional view of the photometer of FIG. 5 illustrating actinic radiation incident at both on-axis and off-axis angles.

This selective suppressing and broadening of the directional response curve of the photometer 60 without effecting a corresponding increase in its extreme field of view may be better understood by now referring to FIGS. 7 and 8 which graphically illustrate the change in focal point for on-axis parallel rays of actinic radiation in comparison to off-axis parallel rays of actinic radiation. Referring now to FIG. 7, there is again shown the conventional photometer 10 receiving both a beam of on-axis parallel rays as shown generally at 53 together with a beam of off-axis parallel rays as shown generally at 54. The on-axis beam of parallel rays 53 which may have a diameter substantially equal to that of the lens 20 are directed by the lens 20 to converge at a focal point A on the optical axis $O_A$. An acceptance angle $\alpha$ may now be defined by those extreme rays which intersect both the on-axis focal point A and the peripheral edges of the photosensitive surface 23 of the transducer 22. Thus, only those on-axis rays which come within a narrow beam of on-axis rays defined by the extreme peripheral rays 53' and 53" ultimately impinge upon the photosensitive surface 23 of the transducer 22 with all other on-axis rays in the beam of rays 53 being directed by the lens 20 to locations outside the photosensitive area 23 of the transducer 22. Thus, only a portion of the on-axis beam of rays 53 ever reach the photosensitive surface 23 of the transducer 22.

Figure 3:
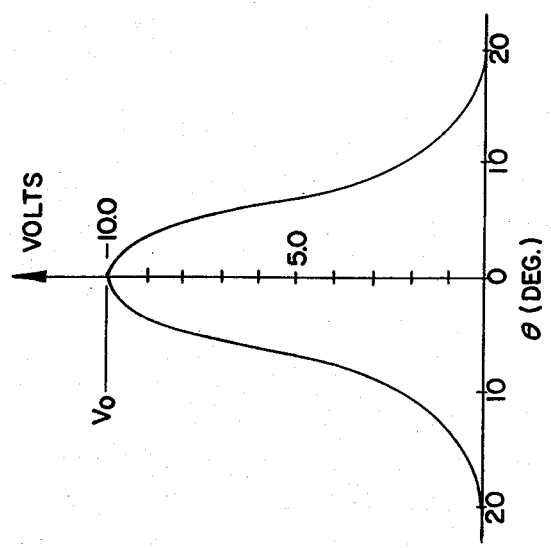
FIG. 3 is a graphical representation of the normalized directional response curve of FIG. 2.

The off-axis beam of rays 54 which may also have a diameter approximating that of the lens 20 are directed by the lens to converge at a different focal point B displaced radially outward from the optical axis $O_A$. As is readily apparent, the focal point B is also displaced further away from the photosensitive surface 23 of the transducer 22 than the on-axis focal point A. An off-axis acceptance angle $\beta$ may now be defined by the extreme rays which intersect both the off-axis focal point B and the peripheral edges of the photosensitive surface 23 of the transducer 22. Thus, only those off-axis rays which come within a narrow beam of off-axis rays defined by the extreme peripheral rays 54' and 54" ultimately reach the photosensitive surface 23 of the transducer 22 with all other off-axis rays in the beam of rays 54 being directed to locations outside the photosensitive area 23 of the transducer 22. As is now readily apparent, a substantially smaller percentage of the off-axis beam of rays 54 will ultimately be directed to the photosensitive surface of the transducer 22 thus accounting for the variable directional response graphically illustrated by the curves of FIGS. 2 and 3.

Referring now to FIG. 8, there is again shown the photometer 60 of this invention as it operates to change the aforementioned acceptance angles $\alpha$ and $\beta$ to provide the directional response as shown in FIG. 6. The on-axis beam of rays 53 is directed by the lens element 62 to converge at a focal point A' on the optical axis $O_A$. Again, the acceptance angle $\alpha$ may be defined by the extreme rays which intersect both the on-axis focal point A' and the peripheral edges of the photosensitive surface of the transducer 64. Again, only those on-axis rays which come within a narrow beam of on-axis rays defined by the extreme peripheral rays 53' and 53" ultimately impinge on the photosensitive surface of the transducer 64, with all other on-axis rays within the beam of rays 53 being directed to locations outside the photosensitive area of the transducer 64. The off-axis beam of parallel rays 54 is directed by the lens element 62 to converge at a focal point B' which is radially displaced from the optical axis $O_A$. Again, the off-axis acceptance angle $\beta$ may be defined by the extreme rays which intersect both the off-axis focal point B' and the peripheral edges of the photosensitive surface of the transducer 64. As is now readily apparent, the off-axis focal point B' is closer to the photosensitive surface of the transducer 64 than the on-axis focal point A'.

Thus, the aspheric surfaces 80 operate to increase the off-axis focal length in correspondence to increasing angular displacement of the incident rays of actinic radiation, in comparison to the conventional photometer of FIG. 10 where the off-axis focal lengths are decreased in correspondence to increasing angular displacement for the off-axis rays. The increase in the off-axis focal lengths as effected by the aspheric surfaces 80 operates to increase the off-axis acceptance angle $\beta$ thereby increasing that portion of the off-axis beam of rays 54 which are ultimately directed by the lens 62 to impinge upon the photosensitive surface of the transducer 64. A comparison of the narrow beam of on-axis rays defined by the extreme peripheral rays 53' and 53" which ultimately impinge upon the photosensitive surface of the transducer 64 and the narrow beam of off-axis rays defined by the extreme peripheral rays 54' and 54" which ultimately impinge upon the photosensitive surface of the transducer 64, can be seen to be approximately the same, thus accounting for the broadening of the directional response curve of FIG. 6. In addition, it can be seen that the aspheric surfaces 80 also operate to decrease the on-axis focal length in comparison to the on-axis focal length of FIG. 7, thereby effecting a corresponding decrease in the on-axis acceptance angle $\alpha$ which accounts for the suppression of the on-axis directional response of the curve of FIG. 6.

Although the aspheric surfaces 80 have been described as being concentric and rotationally symmetric on opposed faces of the lens element 62, to achieve a particular directional response, it is readily apparent that a variety of directional responses may be achieved by aspheric surfaces which are neither concentric nor symmetric with respect to the lens axis and which extend only over a portion of a single face of the lens element 62. Such other aspheric surfaces may be applied to provide a variety of differently shaped directional response curves. Thus, once a desired directional response curve has been defined, it is possible to combine this information with other photometer characteristics which may be utilized to program a computer to provide a ray trace analysis. The computer may be programmed to conduct an analysis by incrementally varying the aspheric surface shape and comparing the resultant directional response pattern for each incremental variation with the desired directional response pattern until a match within some specified tolerance limit is achieved. Thus, the aspheric surfaces 80 may assume many and varied shapes such as that of a hyperbolic curve, in which case the directional response would be suppressed; the on-axis condition and the off-axis response would be a function of the eccentricity of the hyperbola. In addition, aspheric surfaces could be configured to create multiple images which would be of particular advantage for a photometer of the type wherein the scene light admitted from the field is controlled by a scanning aperture type of shutter blade.

As previously discussed, photometers of the abovedescribed type are characteristically utilized in conjunction with appropriate circuitry to provide an output signal which may be utilized as an indication of a suitable F number and exposure time combination that will deliver an appropriate exposure, or alternatively, as a control signal to regulate the closing of an automatic shutter. As previously discussed, the photometer 60 provides an output signal directionally responsive to the angular field position of various scene objects within its field of view. Photographic scenes generally include a number of objects or radiant sources scattered throughout a region in space. Thus, the broadened and suppressed directional response curve 50 of FIG. 6 provides an output response for the photodetector that is substantially less sensitive to the locations in which brightly reflecting subjects are located in a photographic scene. However, enough photographic scenes are centered about a brightly reflective subject against a dark background as to make it generally undesirable to provide a non-varying directional response across the entire field of view of the photometer. Thus, the directional response curve 52 of FIG. 6 represents a very satisfactory and suitable compromise for a directional response curve without widening the extreme field of view. Again, it will be appreciated there is no absolute best directional response curve that would have universal photographic application since light distribution patterns will vary greatly between various photographic scenes.

The photometer 60 provides a single electrical output signal across the leads 76 and 78 which, in the case of a uniformly bright or backlit scene, is representative of the entire volume enveloped by the directional response curve 52 when rotated about its vertical axis in a manner illustrated by FIG. 4. It will now be understood that the volume enveloped by the phantom line curve 50 when rotated about its vertical axis is substantially the same as the volume enveloped by the broadened curve 52. Thus, there is no overall decrease in the output signal from the photoresponsive transducer 64 resulting from broadening the electrical response curve 52 in the aforementioned manner.

In addition, as previously discussed, other directional response patterns may be achieved by configuring the aspheric surface in a different manner. The traditional direct response pattern from a conventional unicell photometer as represented by the bell shaped curve 50 may be manipulated to be compatible with any photographic scene where the brightest reflective photographic subjects are off-axis. It will be further appreciated that more than one aspheric surface may be provided on a single lens element. Thus, it is apparent that the aspheric surface need not be concentric with respect to the optical axis $O_A$ nor need it be rotationally symmetric. It is possible to provide localized aspheric surfaces spaced apart from the optical axis $O_A$ to bias the directional response of the photometer either up or down or left or right. The aspheric surfaces as herein described are only suitable for use in unicell photometers of the defocused type and clearly would not be applicable to a focused unicell photometer as previously discussed.

Since certain changes may be made in the abovedescribed embodiment without departing from the scope of the invention herein involved, it is intended that all matter contained in the above description or shown in the accompanying drawings shall be interpreted as illustrative and not in a limiting sense.

What is claimed is:

1. A defocused unicell photometer for use in photographic apparatus comprising:
   a photosensitive transducer having a photosensitive surface thereon of predetermined dimension, said transducer operating to provide an output response which varies in correspondence to the intensity of actinic radiation incident to said photosensitive surface;
   a positive lens element of predetermined focal length concentrically disposed about an optical axis which axis ultimately intersects said photosensitive surface, said lens element being spaced apart from said photosensitive surface by a distance different from said lens focal length and cooperating with said photosensitive surface to define a field of view for said photometer such that said lens element operates to direct actinic radiation incident thereon from said field of view towards said photosensitive surface, said lens element additionally having at least one non-planar aspheric zone disposed on a surface of said lens element for directing a select portion of actinic radiation, from said field of view in a manner operating to change the intensity of said select portion of actinic radiation which ultimately impinges on said photosensitive surface from said zone thereby effecting a corresponding change in that portion of said output response from said transducer which is directly attributable to said select portion of actinic radiation; and
   means for stationing said transducer and lens element in substantially light-tight, spaced apart relation with respect to each other.

2. The photometer of claim 1 wherein said positive lens element includes at least one concentric, rotationally symmetric aspheric zone on a face thereof, said concentric aspheric zone being characterized by a slope which increases and a radius of curvature which decreases in correspondence with increasing distance from the optical axis for directing said select portion of actinic radiation which directly impinges on said aspheric zone from said field of view in directions generally on said optical axis in a manner operating to reduce the intensity of said on-axis portion of actinic radiation which ultimately impinges on said photosensitive surface from said zone to effect a corresponding suppression in that portion of said output response from said transducer which is directly attributable to said on-axis portion of actinic radiation, said aspheric zone operating to direct that other portion of actinic radiation which directly impinges on said lens element from said field of view in directions substantially off said optical axis to increase the intensity of said other off-axis portion of actinic radiation which ultimately impinges on said photosensitive surface from said lens element to effect a corresponding increase in that portion of said output response from said transducer which is directly attributable to said other off-axis portion of actinic radiation.

3. The photometer of claim 2 wherein said distance by which said lens element is spaced apart from said photosensitive surface is less than said lens focal length.

4. The photometer of claim 2 wherein said aspheric surface comprises opposed convex aspheric surfaces each having a decreasing radius of curvature.

5. The photometer of claim 2 wherein said transducer is of the photovoltaic type.

* * * * *